United States Patent
Von Elling et al.

(10) Patent No.: US 10,832,648 B2
(45) Date of Patent: Nov. 10, 2020

(54) NOISE REDUCTION SYSTEM AND METHOD FOR ACTIVELY COMPENSATING BACKGROUND NOISES

(71) Applicant: recalm GmbH, Hamburg (DE)

(72) Inventors: Marc Von Elling, Hamburg (DE); Martin Günther, Glückstadt (DE); André Kasimir, Hamburg (DE)

(73) Assignee: recalm GmbH, Hamburg (DE)

( * ) Notice: Subject to any disclaimer, the term of this patent is extended or adjusted under 35 U.S.C. 154(b) by 0 days.

(21) Appl. No.: 16/541,363

(22) Filed: Aug. 15, 2019

(65) Prior Publication Data
US 2020/0066246 A1    Feb. 27, 2020

(30) Foreign Application Priority Data
Aug. 22, 2018    (DE) .................. 10 2018 120 503

(51) Int. Cl.
| | |
|---|---|
| *G10K 11/178* | (2006.01) |
| *H04N 13/204* | (2018.01) |
| *G06T 7/70* | (2017.01) |
| *H04R 1/02* | (2006.01) |
| *G06T 7/00* | (2017.01) |

(52) U.S. Cl.
CPC .......... *G10K 11/17823* (2018.01); *G06T 7/70* (2017.01); *G06T 7/97* (2017.01); *H04N 13/204* (2018.05); *H04R 1/025* (2013.01); *G06T 2207/30196* (2013.01); *G10K 2210/128* (2013.01); *G10K 2210/3044* (2013.01); *G10K 2210/3046* (2013.01); *H04R 2499/13* (2013.01)

(58) Field of Classification Search
None
See application file for complete search history.

(56) References Cited

U.S. PATENT DOCUMENTS

| | | |
|---|---|---|
| 5,381,485 A | 1/1995 | Elliott |
| 5,701,350 A | 12/1997 | Popovich |
| 2002/0076059 A1 | 6/2002 | Joynes |

(Continued)

FOREIGN PATENT DOCUMENTS

| | | |
|---|---|---|
| DE | 10036435 C1 | 9/2001 |
| DE | 10113735 A1 | 11/2011 |

(Continued)

*Primary Examiner* — Kenny H Truong
(74) *Attorney, Agent, or Firm* — Rankin, Hill & Clark LLP (57) ABSTRACT

A noise reduction system (2) and a method for actively compensating background noises in a passenger transport area of a vehicle. Said system includes a control unit (8), at least one microphone (10), at least one sound generator (12) and a position detection unit for detecting a position and/or orientation of the head (16) of a user. The control unit (8) is coupled to the position detection unit on an input side, is configured to receive position data and to determine a position signal from the position data, and to generate an antinoise signal from the background noise signal and the position signal. The sound generator (12) is configured to generate antinoise from the antinoise signal such that, by superimposing the antinoise in a quiet zone (20a, 20b) within the passenger transport area, which antinoise is in phase opposition with the background noise, active reduction of the background noise is achieved. The position detection unit is a 3D camera arrangement (14).

10 Claims, 5 Drawing Sheets

(56) References Cited

U.S. PATENT DOCUMENTS

| | | | |
|---|---|---|---|
| 2002/0140215 A1 | 10/2002 | Breed et al. | |
| 2008/0037803 A1 | 2/2008 | Breed | |
| 2009/0274320 A1 | 11/2009 | Kino et al. | |
| 2016/0027428 A1 | 1/2016 | Gul et al. | |
| 2016/0329040 A1 | 11/2016 | Whinnery | |
| 2019/0251948 A1* | 8/2019 | Hayashi | G10K 11/17854 |
| 2019/0304431 A1* | 10/2019 | Cardinaux | G10K 11/17813 |

FOREIGN PATENT DOCUMENTS

| | | |
|---|---|---|
| DE | 102013202810 A1 | 8/2014 |
| DE | 102017109060 | 5/2018 |
| DE | 102018001455 A1 | 8/2018 |

\* cited by examiner

NOISE REDUCTION SYSTEM AND METHOD FOR ACTIVELY COMPENSATING BACKGROUND NOISES

PRIORITY CLAIM

This application claims priority to German Patent Application No. 10 2018 120 503.1, filed Aug. 22, 2018.

BACKGROUND OF INVENTION

Field of Invention

The invention relates to a noise reduction system for actively compensating background noises in a passenger transport area of a vehicle, comprising a control unit, at least one microphone for detecting a background noise, at least one sound generator for generating antinoise and a position detection unit for detecting a position and/or orientation of the head of a user in the passenger transport area, the control unit
- being coupled to the microphone on the input side and being configured to receive a background noise signal,
- being coupled to the position detection unit on the input side, being configured to receive position data and to determine a position signal from the position data, the position signal indicating the position and/or orientation of the head of the user relative to the position detection unit,
- being configured to generate an antinoise signal from the background noise signal and the position signal,
- being coupled to the sound generator on the output side and being configured to provide the antinoise signal, and
the sound generator being configured to generate antinoise from the antinoise signal such that, by superimposing the antinoise in a quiet zone within the passenger transport area, which antinoise is in phase opposition with the background noise, active reduction of the background noise can be achieved.

The invention further relates to a method for actively compensating background noises in a passenger transport area of a vehicle, in which method a background noise is detected by at least one microphone and the background noise is converted into a background noise signal by the microphone, position data is detected by a position detection unit and, from the position data, a position signal is determined which indicates a position and/or orientation of the head of a user in the passenger transport area relative to the position detection unit, an antinoise signal is generated from the background noise signal and the position signal, antinoise is generated from the antinoise signal by a sound generator, and the antinoise is superimposed on the background noise so as to be in phase opposition therewith in a quiet zone within the passenger transport area such that active reduction of the background noise is achieved in the quiet zone.

Brief Description of Related Art

Noise reduction systems are known in various configurations. Noise reduction systems are also referred to as noise suppression systems, background noise suppression systems, background noise reduction systems and noise-canceling systems. A distinction is made between active and passive systems. In the case of a passive system, sound-absorbing materials are used in order to reduce the undesired background noises. In the case of active noise reduction systems, which are also referred to as active noise canceling or active noise control systems (often abbreviated to ANC), active noise compensation by means of antinoise (also referred to as counter-noise) is used. Antinoise is superimposed on the undesired background noise such that the background noise is reduced or eliminated in a quiet zone by means of destructive interference. In the context of the present specification, only active noise reduction systems are explained, even if these are not explicitly referred to as active noise reduction systems, but rather merely as noise reduction systems.

In the case of an active noise reduction system, efficient suppression of the background noise can only be achieved within a small spatial region. The antinoise is only superimposed on the background noise in this quiet zone so as to be in exact phase opposition therewith to such an extent that efficient suppression of the background noise takes place. Said spatial limitation of the region in which efficient noise reduction can be achieved results in noise reduction systems being very sensitive to movements of the head of a user. As soon as the entrance to the auditory canal is no longer within the quiet zone, in which efficient noise suppression takes place, on account of a slight movement or rotation of the head, the noise reduction systems quickly lose their effectiveness.

A noise reduction system is known from DE 100 36 435 C1, in which a spatial position or orientation of the head of a listener is detected using a sensor. A control unit coupled to the sensor is configured to generate the antinoise signal depending on the position or orientation of the listener. An optical sensor that is mounted to the side in a roof rail of a vehicle is provided as the sensor for detecting the spatial position of the head. The image detected by the optical sensor is evaluated and the position and orientation of the head is calculated.

Another noise reduction system is known from DE 10 2013 202 810 A1. This system comprises a position detection unit arranged in a headrest of a seat of a motor vehicle for detecting a body part of a user of the vehicle that is relevant for the background noise suppression, i.e., the ears. A region of the interior of the motor vehicle in front of the headrest is divided into a plurality of spatial segments. Depending on the identified position of the ears of the user, the background noise suppression is optimized for the segment in which the ears of the user are located. Said quantization of the space reduces the computing power required, since the calculation of the antinoise signal does not directly depend on an identified position of the ears of the user. The calculation takes place dynamically for one selected segment or the other of the interior for which the associated transmission functions were previously determined. The position of the head of the user is detected by means of a plurality of ultrasonic sensors.

The dynamic adaptation of the noise reduction is achieved by moving a virtual microphone that receives the error or background noise. Said virtual microphone is moved by way of computation into the region in which the active noise damping is intended to take place. This technique is described, for example, in U.S. Pat. No. 5,701,350 and in U.S. Pat. No. 5,381,485.

An object of the invention is to specify an improved noise reduction system and an improved method for actively compensating background noises.

BRIEF SUMMARY OF THE INVENTION

The object is solved by a noise reduction system for actively compensating background noises in a passenger transport area of a vehicle, comprising a control unit, at least one microphone for detecting a background noise, at least one sound generator for generating antinoise and a position detection unit for detecting a position and/or orientation of the head of a user in the passenger transport area, the control unit
  being coupled to the microphone on the input side and being configured to receive a background noise signal,
  being coupled to the position detection unit on the input side, being configured to receive position data and to determine a position signal from the position data, the position signal indicating the position and/or orientation of the head of the user relative to the position detection unit,
  being configured to generate an antinoise signal from the background noise signal and the position signal,
  being coupled to the sound generator on the output side and being configured to provide the antinoise signal,
the sound generator being configured to generate antinoise from the antinoise signal such that, by superimposing the antinoise in a quiet zone within the passenger transport area, which antinoise is in phase opposition with the background noise, active reduction of the background noise can be achieved, the noise reduction system being developed in that the position detection unit is a 3D camera arrangement.

A position of the head of the user can be accurately detected using a 3D camera arrangement. It has been recognized that this type of position detection is superior to conventional approaches. For example, it is possible to come to a very accurate conclusion as to the location of the ear/ears of the user based on the head shape without the ear/ears of the user being visible as such. The point on the head of the user at which the auditory canal exits can only be determined very accurately without the ear itself having to be detected by using 3D detection. In this case, it is sufficient to detect the position of a single ear of the user. Proceeding from this position, with knowledge of the geometry, inclination and position of the head of the user that are also detected, the location of the opposite ear can be deduced.

Based on the position of the ear, the quiet zone is actively adjusted to the head movements of the user such that excellent noise suppression can be achieved when active noise reduction is applied in free field.

The noise reduction system for example comprises two sound generators. The sound generators are loudspeakers, for example. These are arranged on both sides of the head of the user, for example. The 3D camera arrangement, which is also referred to as a stereo camera, comprises two individual cameras.

The motor vehicle is, for example, a car, a truck, or a utility vehicle, for example a construction machine or an agricultural machine. The use of said noise reduction system is particularly advantageous in the case of construction machines, since these vehicles are characterized by high levels of operating noise even in the passenger transport area.

According to an advantageous embodiment, the 3D camera arrangement forms a spatially enclosed structural unit together with the at least one microphone, the at least one sound generator and the control unit.

The arrangement of the aforementioned functional units in an enclosed structural unit makes it possible to provide the noise reduction system as a spare part or accessory, meaning that practically no additions or modifications to the vehicle are required. This represents a significant advantage with respect to existing systems, which have to be integrated deep within the vehicle. Advantageously, this noise reduction system does not require this and is therefore particularly well suited for the secondary market.

The spatially enclosed structural unit may be a headrest of a vehicle, for example. In this case, it is possible simply to replace the existing headrest with a headrest in which the noise reduction system is integrated. An exchange of this kind is quick and simple.

According to another advantageous embodiment, the noise reduction system is developed in that the unit comprises fastening means such that the unit can be mounted on a headrest of a motor vehicle.

A noise reduction system of this kind allows for retrofitting, even without the headrest of the vehicle having to be exchanged.

Furthermore, the unit in particular projects beyond the headrest on both sides in a horizontal direction or the unit projects beyond the headrest in a vertical direction. At least the 3D camera arrangement, and optionally at least one sound generator, is arranged in the portions projecting beyond the headrest.

If the above-mentioned units form a spatially enclosed structural unit, this is further advantageous since the spatial relationship between the sound generator and the 3D camera arrangement can be determined during manufacture and is then permanently set. Said spatial relationship is important, since the position of the ear of the user is detected by means of the 3D camera arrangement and the antinoise for the relevant position is output by means of the sound generator depending on said position, as a result of which the quiet zone is always at the ear of the user. In the case of systems in which the position detection unit and the sound generator are spatially decoupled from one another, the system must constantly be precisely calibrated in order to achieve the effect described with sufficient accuracy. This can advantageously be dispensed with in the noise reduction system according to the above-mentioned embodiment. Therefore, it is merely necessary, for example, to exchange the headrest of a motor vehicle with a headrest in which a noise reduction system is integrated. The same applies to the addition of a noise reduction system that can be mounted on the headrest.

According to another advantageous embodiment, the 3D camera arrangement comprises at least one first and one second camera, and a stereo base is oriented vertically between the first and the second camera.

In the context of the present specification, "vertical" means the direction that extends in an upright manner or perpendicularly with respect to a conventional sitting position of the user. If the vehicle is absolutely straight, said vertical direction corresponds to the direction of gravity.

The stereo base between the first and the second camera may also extend vertically downward instead of upward. In other words, the first camera is mounted higher than the second camera. In this case, no exact vertical alignment of the stereo base is required.

The orientation of the stereo base in the directions described has proven advantageous for efficient and accurate detection of the head position of the user.

Furthermore, the viewing axes of the first and second camera are in particular not oriented in parallel with one another, but are instead inclined at an angle of between 0° and 30° relative to one another; however, it is also possible to orient said cameras in parallel with one another.

Furthermore, for example, more than one 3D camera arrangement may be provided. For example, two 3D camera arrangements may be provided, one 3D camera arrangement being provided on the left-hand side and another being provided on the right-hand side of the head of the user.

Moreover, according to another embodiment, a plurality of microphones is provided for detecting the background noise, four microphones per quiet zone in particular being provided.

By using a plurality of microphones, a position of a so-called virtual microphone in the space can be identified. The virtual microphone identifies the background noise at the location of the ear of the user, and the antinoise signal is calculated accordingly. Four microphones have proven to be a good compromise between precise positioning of the virtual microphone on the one hand and computing effort on the other. Four microphones per quiet zone, i.e., a total of eight microphones, may be provided. It is also possible to provide a total of four microphones, which are used for both quiet zones.

In the context of the present specification, the error microphones are always referred to as microphones. Depending on whether the noise reduction system is a feedforward system (with a reference sensor) or a feedback system (without a reference sensor), in addition to the error microphones, said system also comprises another reference sensor, which directly measures the background noise. The reference sensor may also be a microphone, but it may also be an acceleration sensor, for example.

According to another advantageous embodiment, the noise reduction system is developed in that the control unit comprises a neural network which is configured to receive image data or an image data stream from the 3D camera arrangement as position data and to determine and output the position signal, which indicates the position and/or orientation of the head of the user relative to the position detection unit.

By using a neural network, the image data or image data stream from the 3D camera arrangement can be evaluated quickly and efficiently. Moreover, the neural network can be trained by means of a training data set to precisely detect the position of the ear on the head of a user without the ear actually being visible in the image data.

According to another embodiment, the control unit comprises an FPGA and in particular the neural network is implemented in the FPGA. The calculations required for actively compensating the background noises take place in the FPGA. Said calculations in particular include the calculation of the counter-noise signal and the calculation of the position and/or orientation of the head of the user, from which a position for their left and right ear is calculated.

An FPGA allows parallel computing operations. The calculations required for actively compensating background noises may be carried out simultaneously and in real-time. In contrast to an FPGA, sequential processor architectures (DSP, CPU) quickly reach their limits when performing such tasks, since it is no longer possible to adhere to the real-time pattern. Sequential processor architectures provide the option of multithreading when using an operating system. However, in this case, a deterministic cycle time cannot be guaranteed. An FPGA offers this possibility, i.e., the FPGA has always completed the required calculation after a known and predefined cycle time. This is particularly advantageous for the present application.

The object is further achieved by a method for actively compensating background noises in a passenger transport area of a vehicle, in which method a background noise is detected by at least one microphone and the background noise is converted into a background noise signal by the microphone, position data is detected by a position detection unit and, from the position data, a position signal is determined which indicates a position and/or orientation of the head of a user in the passenger transport area relative to the position detection unit, an antinoise signal is generated from the background noise signal and the position signal, antinoise is generated from the antinoise signal by a sound generator, and the antinoise is superimposed on the background noise so as to be in phase opposition therewith in a quiet zone within the passenger transport area such that active reduction of the background noise is achieved in the quiet zone, the method being developed in that the position detection unit is a 3D camera arrangement and 3D image data or a 3D image data stream being generated as position data.

The same or similar advantages apply to the method as were previously mentioned with respect to the noise reduction system itself, and therefore repetitions will be omitted.

The method is in particular developed in that, in the method, the position data is fed into a neural network and the neural network generates the position signal from the position data and outputs said position signal, which indicates the position and/or orientation of the head of the user relative to the position detection unit.

Advantageously, a fixed reference system is provided between the previously mentioned units, i.e., the 3D camera arrangement, the at least one microphone and the sound generator.

Further features of the invention will become apparent from the description of the embodiments according to the invention together with the claims and the attached drawings. Embodiments according to the invention can fulfill individual features or a combination of several features.

BRIEF DESCRIPTION OF THE DRAWINGS

The invention is described below, without restricting the general idea of the invention, using exemplary embodiments with reference to the drawings, express reference being made to the drawings with regard to all details according to the invention that are not explained in greater detail in the text. In the following.

In the drawings, the same or similar elements and/or parts are provided with the same reference numbers in order to prevent the item from needing to be reintroduced.

DETAILED DESCRIPTION OF THE INVENTION

Figure 1:
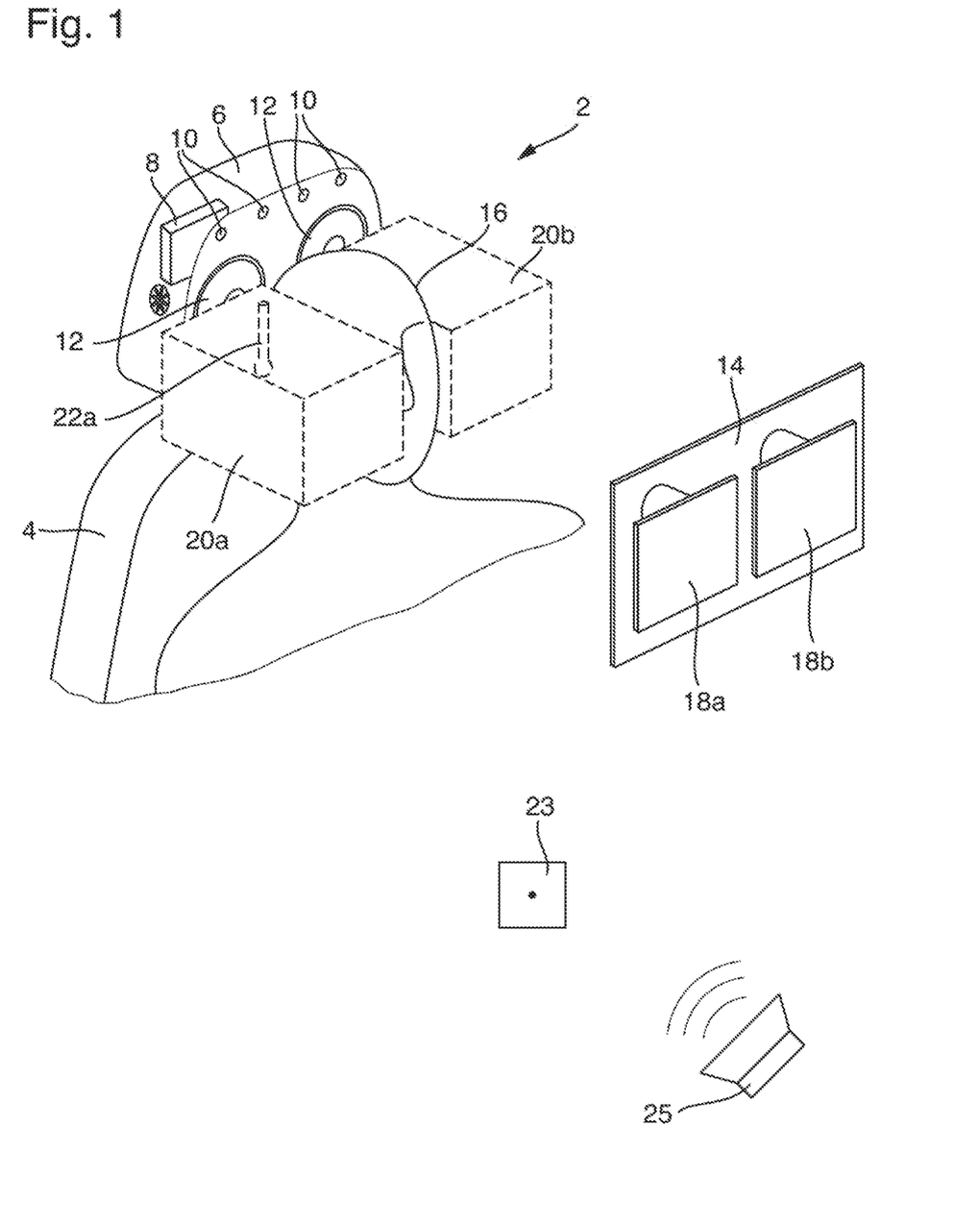
FIG. 1 shows a noise reduction system in a schematically simplified perspective view.

FIG. 1 shows a noise reduction system 2 for actively compensating background noises. The noise reduction system 2 is mounted in a passenger transport area of a vehicle, which is not shown as such. With regard to the vehicle, merely part of a driver's seat 4 having a headrest 6 attached thereto is shown in a schematic and simplified manner. The vehicle is, for example, a car, a truck or another utility vehicle. Said vehicle is, for example, a construction machine or agricultural machine.

The noise reduction system 2 comprises a control unit 8 and a plurality of microphones 10. A noise reduction system 2 having eight microphones 10 is shown by way of example. The microphones 10 are arranged on the upper and lower edge of the headrest 6 and integrated therein. Of the eight microphones 10, the microphones 10 provided on the lower edge of the headrest 6 are hidden, and only the microphones 10 provided on the upper edge of the headrest 6 are visible. The microphones 10 are used to detect a background noise.

The background noise is emitted by a noise source 25. A reference sensor 23 is located between the noise source 25 and the microphones 10, which reference sensor may also be a microphone. The reference sensor 23 is optional. The need for a reference sensor depends on whether the noise reduction system 2 is a feedforward system (with a reference sensor 23) or a feedback system (without a reference sensor 23). Instead of a microphone as the reference sensor 23, which directly measures the background noise emitted by the noise source 25, an acceleration sensor may also be provided, for example. An engine speed or other suitable parameter may also be fed into the system. Using the data from the acceleration sensor, the engine speed or another parameter, the background noise context of the vehicle can be deduced on the basis of a model. Said background noise context is used as the basis for the calculation of the antinoise signal instead of the background noises detected by a microphone used as the reference sensor 23. The reference sensor 23 couples its signal into the control unit 8 on the input side. In the case of a feedback system, the reference sensor 23 can be dispensed with.

Furthermore, the noise reduction system 2 comprises at least one sound generator 12. A system is shown which comprises two sound generators 12, which are loudspeakers, by way of example. The sound generators are used to generate antinoise. Furthermore, the noise reduction system 2 comprises a position detection unit for detecting a position and/or orientation of the head 16 of a schematically indicated user. The position detection unit is a 3D camera system 14. The user, who is the driver of the vehicle, for example, is located in a passenger transport area of the vehicle.

The control unit 8 is coupled to the eight microphones 10 on the input side. The microphones 10 detect the background noise, convert same into a background noise signal, and couple said signal into the control unit 8 on the input side. By virtue of the plurality of microphones 10, it is possible to provide a virtual sensor both for the right and for the left ear of the user, such that efficient noise reduction can be provided at the relevant ear of the user.

However, this requires the noise reduction system 2 to know the exact position of the ears of the user, more specifically the position of the exit of the auditory canal. The noise reduction system 2 comprises the position detection unit for this purpose. Said position detection unit generates position data in the form of 3D image data or a 3D image data stream. The 3D camera arrangement 14 comprises a first camera 18a and a second camera 18b. The position data is converted into a position signal in the processing unit 8, which signal indicates the position and/or orientation of the head 16 of the user relative to the 3D camera arrangement 14. Therefore, in other words, the position and/or orientation of the head 16 of the user relative to the 3D camera arrangement 14 is known. Since the 3D camera arrangement 14 is permanently installed in the vehicle, the spatial relationship between the sound generators 12 and the 3D camera arrangement 14 can be calibrated such that the control unit 8 can calculate an antinoise signal from the background noise and the position signal. For this purpose, the location of a virtual microphone 22a that is at least close to the entrance of the auditory canal of the user is calculated.

The processing unit 8 provides the antinoise signal on the output side. The antinoise signal is calculated from the data of the reference sensor 23 or from the data detected by the microphones 10 depending on whether the noise reduction system 2 is a feedforward system (with a reference sensor 23) or a feedback system (without a reference sensor 23).

The sound generators 12 are configured to generate antinoise from the antinoise signal, which antinoise is superimposed on the background noise within the right-hand and left-hand quiet zone 20a, 20b such that the background noise is actively reduced.

If the user moves their head, said movement is detected by the position detection unit 14 and the quiet zones 20a, 20b are also moved in a corresponding manner. It is therefore possible to provide efficient active noise damping, for example in a utility vehicle, in particular a construction machine or agricultural machine.

Figure 2:
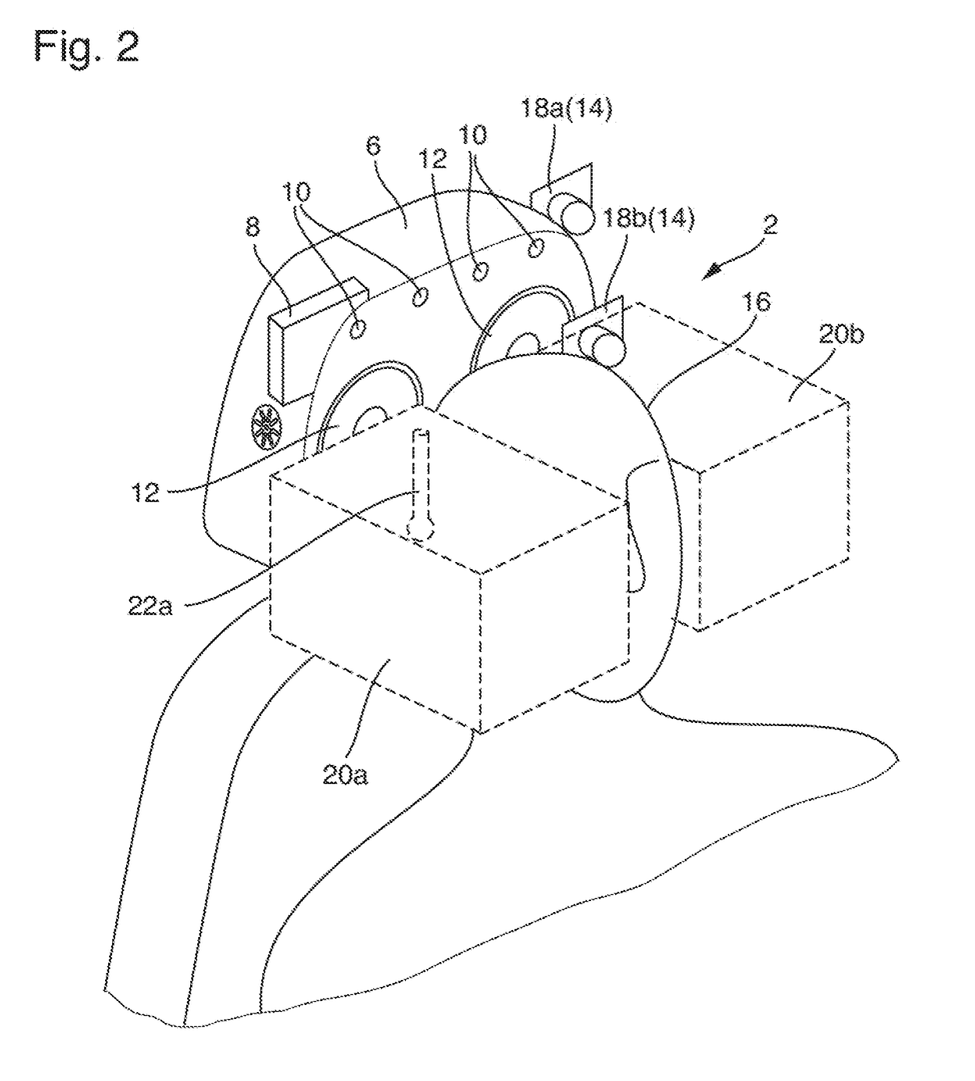
FIG. 2 shows another noise reduction system in a schematically simplified perspective view.

According to another exemplary embodiment, the noise reduction system 2 is developed in that the 3D camera arrangement 14 forms a spatially enclosed structural unit together with the microphones 10, the sound generators 12 and the control unit 8. This is shown in FIG. 2. In this figure, the noise reduction system 2 is completely integrated in the headrest 6 of the motor vehicle. The 3D camera arrangement 14, comprising the first camera 18a and the second camera 18b, is attached to the side of the headrest. The remaining elements of the noise reduction system 2 have already been described in connection with FIG. 1. Using the 3D camera arrangement 14, the position of the head 16 of the user is detected such that the virtual microphone 22a can be moved along together with the movement of the head 16 of the user. By way of example, only the virtual microphone 22a for the right ear of the user is shown. Of course, there is also a left-hand virtual microphone (not visible in the figure) on the opposite side of the head 16 of the user. Said microphone is of course also moved along during movements of the head of the user.

Figure 3:
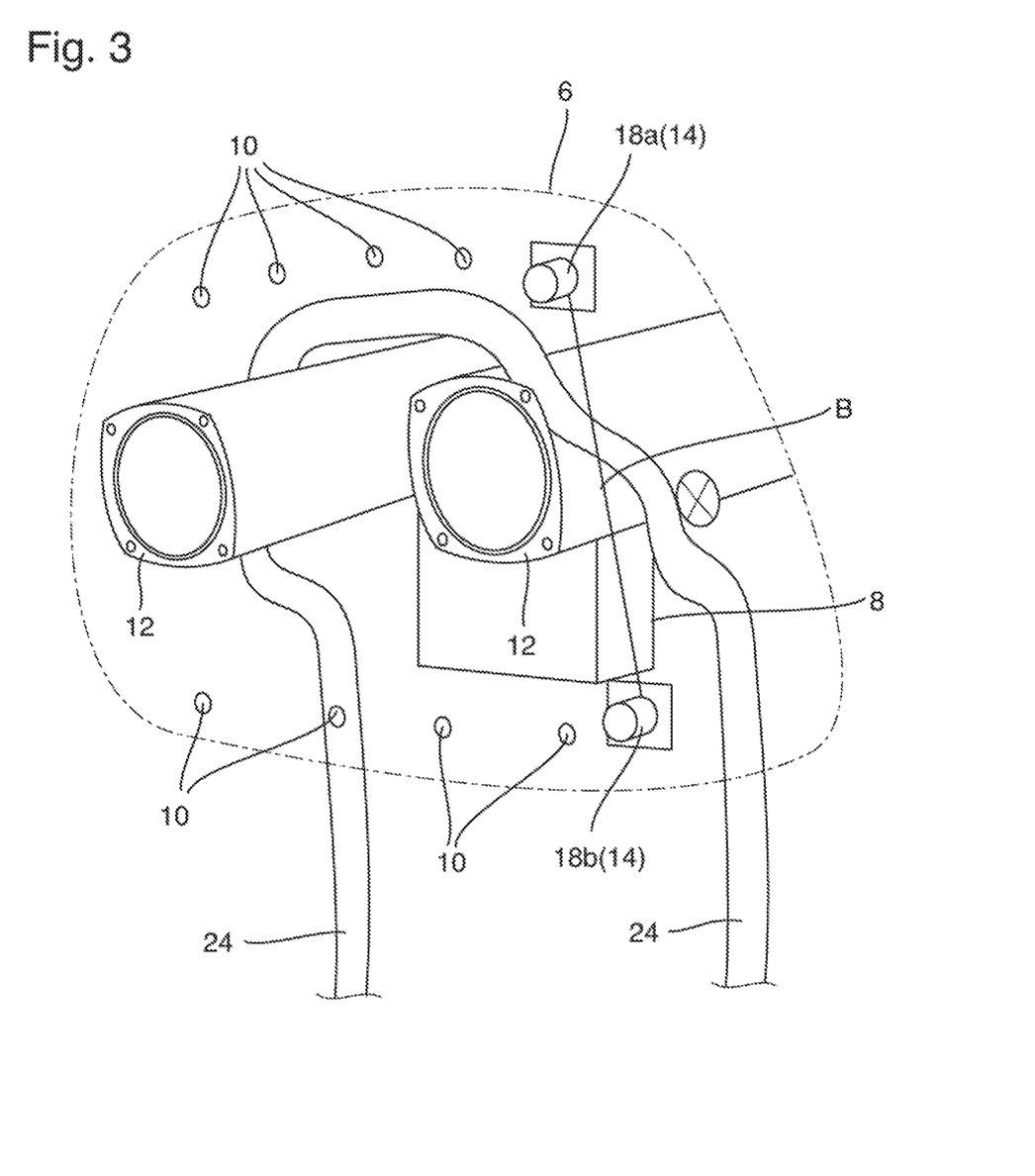
FIG. 3 shows said noise reduction system integrated in a headrest in another schematically simplified perspective view.

FIG. 3 shows the system known from FIG. 2 in a schematically simplified perspective view. By way of example, said system comprises eight microphones, which are arranged along the upper and lower edge of the headrest 6. The first camera 18a and the second camera 18b are arranged such that a stereo base B extending between the cameras extends from top to bottom. In other words, the first camera 18a is arranged higher than the second camera 18b. The stereo base B is in particular vertically arranged, i.e., it extends in an at least approximately perpendicular manner. The cameras 18a, 18b of the 3D camera arrangement 14 are arranged in a lateral portion of the headrest 6. Said cameras are arranged in the headrest 6 such that they can detect the head 16 of the user at the side from behind.

Figure 4:
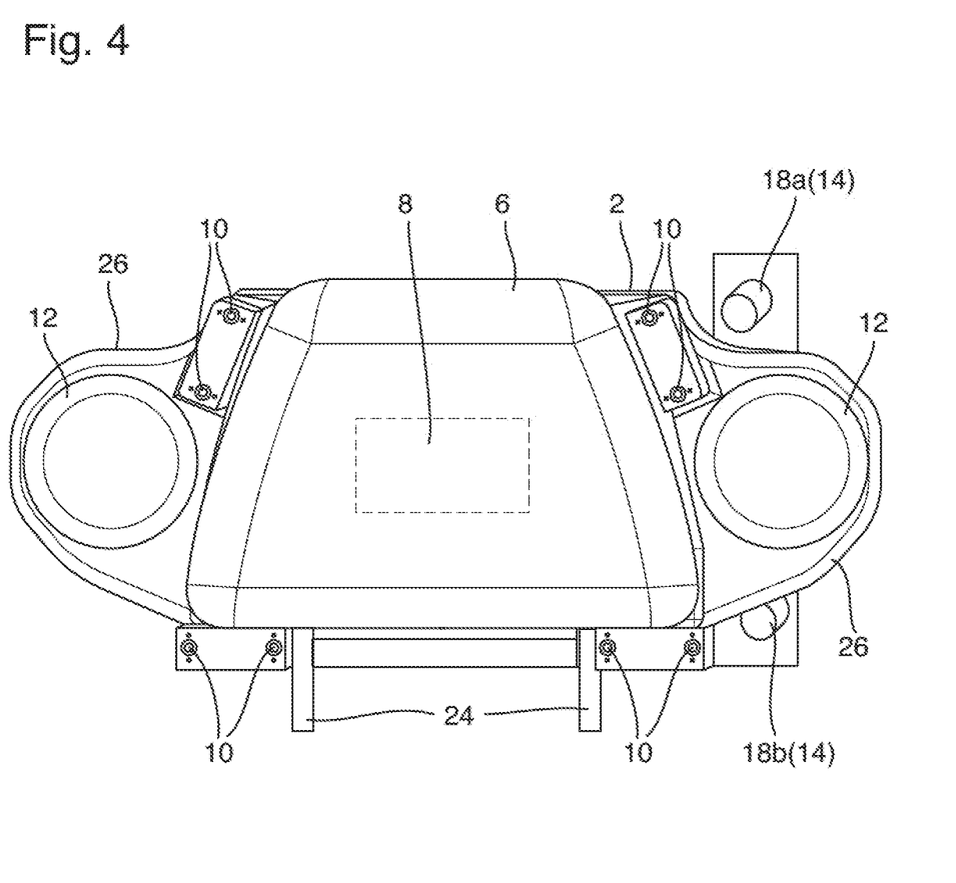
FIG. 4 shows a noise reduction system that can be mounted on a headrest in a schematically simplified front view.
Figure 5:
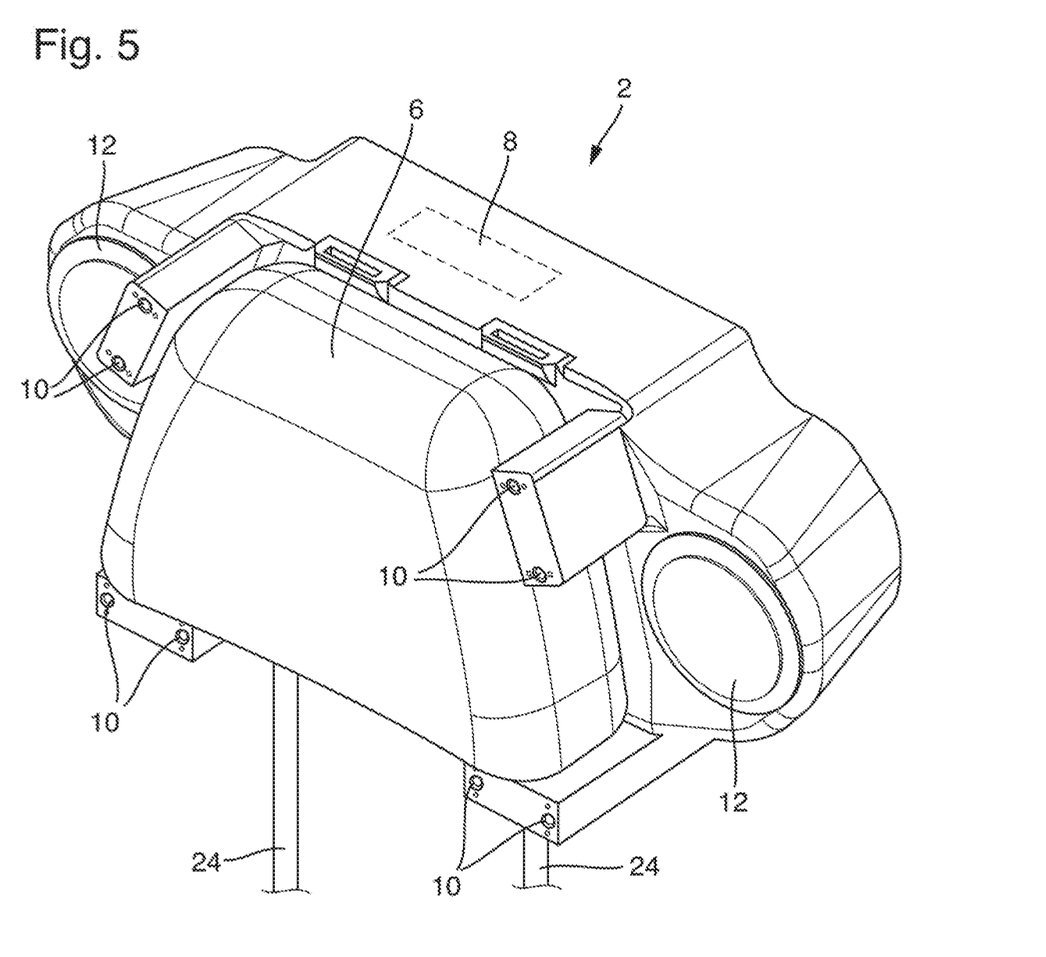
FIG. 5 shows said noise reduction system in a schematically simplified perspective view.

FIGS. 4 and 5 show another exemplary embodiment of a noise reduction system 2. In this case, too, the 3D camera arrangement 14, comprising the first camera 18a and the second camera 18b, the microphones 10, the sound generators 12 and the control unit 8 are housed in a spatially enclosed structural unit. Said unit is mounted on a headrest 6 of a motor vehicle. Belts (not shown) may for example be used to fasten the unit to the headrest 6. Furthermore, the unit may additionally be fastened to the support rods 24 of the headrest 6, if required. The control unit 8 is arranged in the rear portion of the unit (not visible in the figure and therefore shown as a dashed line). The unit projects beyond the headrest 6 on both sides in a horizontal direction, at least the sound generators 12 being housed in the lateral portions 26 projecting beyond the headrest 6. According to the exemplary embodiment shown, one portion 26 projecting beyond the headrest 6 also comprises the 3D camera arrangement 14.

FIG. 5 shows the noise reduction system 2 known from FIG. 4 in a schematically perspective view. For reasons of clarity, the 3D camera arrangement is not shown in FIG. 5.

Similarly, the electrical connections used for the data connection between the individual units and for the power supply thereof are not shown in any of the figures for reasons of clarity. Said electrical connections are achieved using conventional technical means.

The control unit 8 of the noise reduction system 2 comprises a neural network that is configured to receive the image data or image data stream generated by the 3D camera arrangement 14. The neural network processes said 3D image data and outputs a position signal which indicates the position and/or orientation of the head 16 of the user relative to the position detection unit 14.

According to a method for actively compensating background noises in a passenger transport area of a vehicle, in particular a construction machine, a background noise is detected using a microphone 10 and the background noise is converted into a background noise signal by the microphone 10. By means of a 3D camera arrangement 14, which provides a position detection unit, position data is detected and a position signal is determined from said position data. This takes place, for example, in the control unit 8. The position signal indicates a position and/or orientation of the head 16 of a user in the passenger transport area relative to the position detection unit. An antinoise signal is generated from the background noise signal and the position signal and said antinoise signal is converted into antinoise by a sound generator 12, which is preferably a loudspeaker. The antinoise is superimposed on the background noise so as to be in phase opposition therewith in one, preferably two, quiet zones 20*a*, 20*b* located within the passenger transport area and located within immediate proximity of the ears of the user, such that the background noise is actively reduced in the quiet zones 20*a*, 20*b*.

All named features, including those taken from the drawings alone and also individual features which are disclosed in combination with other features, are considered alone and in combination as essential for the invention. Embodiments according to the invention can be fulfilled by individual features or a combination of several features. Within the scope of the invention, features which are designated with "in particular" or "preferably" are understood to be optional features.

LIST OF REFERENCE SIGNS

The following reference signs appear in the accompanying drawing figures:
- 2 Noise reduction system
- 4 Driver's seat
- 6 Headrest
- 8 Control unit
- 10 Microphone
- 12 Sound generator
- 14 3D camera arrangement
- 16 Head
- 18*a* First camera
- 18*b* Second camera
- 20*a* Right-hand quiet zone
- 20*b* Left-hand quiet zone
- 22*a* Right-hand virtual microphone
- 23 Reference sensor
- 24 Support rods
- 25 Noise source
- 26 Lateral portion
- B Stereo base

What is claimed is:

1. A noise reduction system for actively compensating background noises in a passenger transport area of a vehicle, said system comprising:
   a control unit;
   at least one microphone for detecting a background noise;
   at least one sound generator for generating antinoise; and
   a position detection unit for detecting a position and/or orientation of a head of a user in the passenger transport area;
   wherein the control unit is coupled to the at least one microphone on an input side and is configured to receive a background noise signal,
   wherein the control unit is coupled to the position detection unit on the input side, and is configured to receive position data and to determine a position signal from the position data, the position signal indicating the position and/or orientation of the head of the user relative to the position detection unit,
   wherein the control unit is configured to generate an antinoise signal from the background noise signal and the position signal,
   wherein the control unit is coupled to the at least one sound generator on an output side and is configured to provide the antinoise signal,
   wherein the at least one sound generator is configured to generate antinoise from the antinoise signal such that, by superimposing the antinoise in one or more quiet zones within the passenger transport area, which antinoise is in phase opposition with the background noise, active reduction of the background noise is achieved in the one or more quiet zones,
   wherein the position detection unit is a 3D camera arrangement,
   wherein the 3D camera arrangement is housed in a spatially enclosed structural unit that is mountable on a headrest in the passenger transport area of the vehicle, and
   wherein, when the spatially enclosed structural unit is mounted on the headrest, the 3D camera arrangement is arranged in a portion of the spatially enclosed structural unit that projects beyond a side of the headrest or beyond a top of the headrest.

2. The noise reduction system according to claim 1, wherein the spatially enclosed structural unit also houses the at least one microphone, the at least one sound generator and the control unit.

3. The noise reduction system according to claim 1, wherein the spatially enclosed structural unit comprises fastening means for mounting the spatially enclosed structural unit on the headrest of the motor vehicle.

4. The noise reduction system according to claim 1, wherein the 3D camera arrangement comprises at least a first camera and at least a second camera, wherein, when the spatially enclosed structural unit is mounted on the headrest, the first camera is arranged above the second camera, and wherein a stereo base provided between the first camera and the second camera.

5. The noise reduction system according to claim 1, wherein the at least one microphone is one of a plurality of microphones provided for detecting the background noise in each of the one or more quiet zones.

6. The noise reduction system according to claim 5, wherein four microphones are provided for detecting the background noise in each of the one or more quiet zones.

7. The noise reduction system according to claim 1, wherein the control unit comprises a neural network which is configured to receive image data or an image data stream from the 3D camera arrangement as position data and to determine and output the position signal, which indicates the position and/or orientation of the head of the user relative to the position detection unit.

8. The noise reduction system according to claim 7, wherein the control unit comprises an FPGA and the neural network is implemented in the FPGA.

9. A method for actively compensating background noises in a passenger transport area of a vehicle, the method comprising:
   detecting a background noise with at least one microphone;
   converting the background noise into a background noise signal using the microphone;
   detecting position data using a position detection unit;
   determining, from the position data using the position detection unit, a position signal which indicates a position and/or orientation of head of a user in the passenger transport area relative to the position detection unit;
   generating an antinoise signal from the background noise signal and the position signal; and
   generating antinoise from the antinoise signal by a sound generator;
   wherein the antinoise is superimposed on the background noise so as to be in phase opposition therewith in one or more quiet zones within the passenger transport area such that active reduction of the background noise is achieved in the one or more quiet zones,
   wherein the position detection unit is a 3D camera arrangement,
   wherein the 3D camera arrangement is housed in a spatially enclosed structural unit that is mountable on a headrest in the passenger transport area of the vehicle,
   wherein, when the spatially enclosed structural unit is mounted on the headrest, the 3D camera arrangement is arranged in a portion of the spatially enclosed structural unit that projects beyond a side of the headrest or beyond a top of the headrest, and
   wherein 3D image data or a 3D image data stream is generated as the position data.

10. The method according to claim 9, wherein the position data is fed into a neural network and the neural network generates the position signal from the position data and outputs said position signal, which indicates the position and/or orientation of the head of the user relative to the position detection unit.

* * * * *

UNITED STATES PATENT AND TRADEMARK OFFICE
CERTIFICATE OF CORRECTION

PATENT NO. : 10,832,648 B2
APPLICATION NO. : 16/541363
DATED : November 10, 2020
INVENTOR(S) : Marc Von Elling et al.

Page 1 of 1

It is certified that error appears in the above-identified patent and that said Letters Patent is hereby corrected as shown below:

In the Claims

In Column 10, Line 66, Claim 4: insert --is-- between --base-- and --provided--

Signed and Sealed this
Twelfth Day of January, 2021

Andrei Iancu
*Director of the United States Patent and Trademark Office*